Dec. 14, 1965 E. Q. SYLVESTER 3,222,735
PRESSURE CASTING APPARATUS WITH GAS-PERMEABLE CHILL ASSEMBLY
Filed June 19, 1963 5 Sheets-Sheet 1

Witness:
Robert O. Velte

INVENTOR.
Edmund Q. Sylvester
BY
Walter J. Schlegel Jr.
Atty.

Dec. 14, 1965  E. Q. SYLVESTER  3,222,735
PRESSURE CASTING APPARATUS WITH GAS-PERMEABLE CHILL ASSEMBLY
Filed June 19, 1963  5 Sheets-Sheet 2
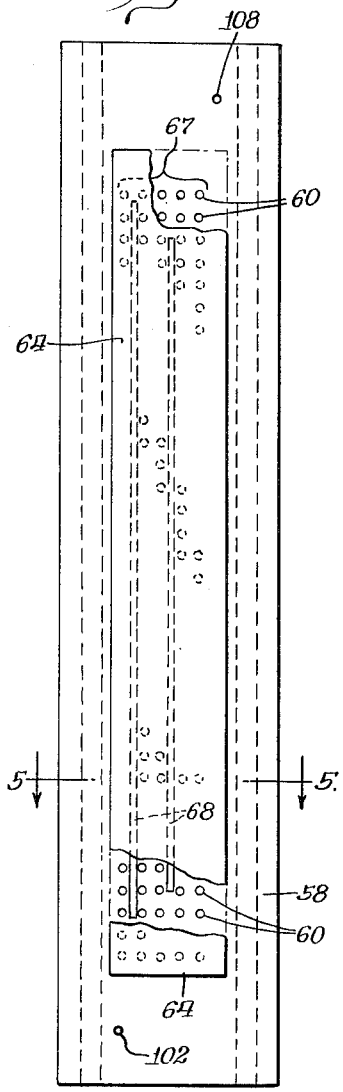
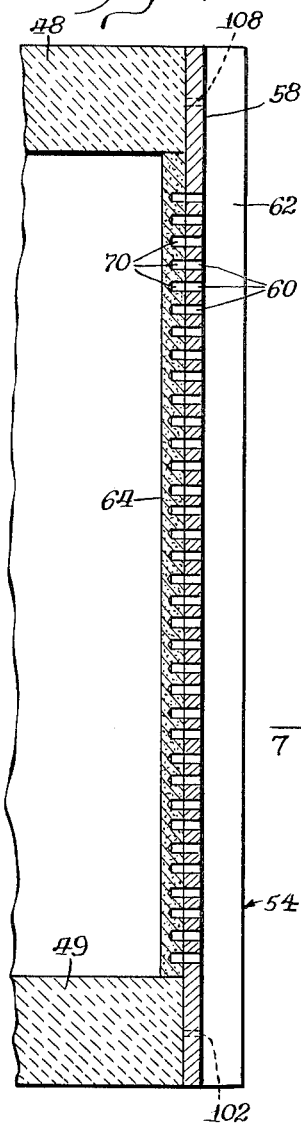
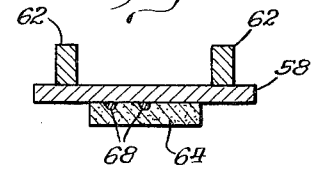
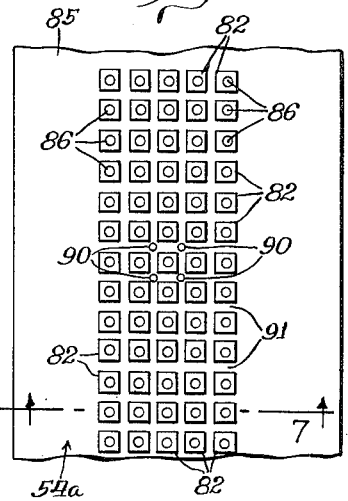
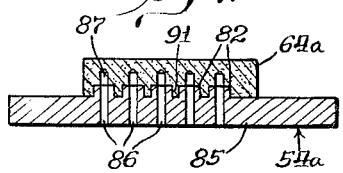
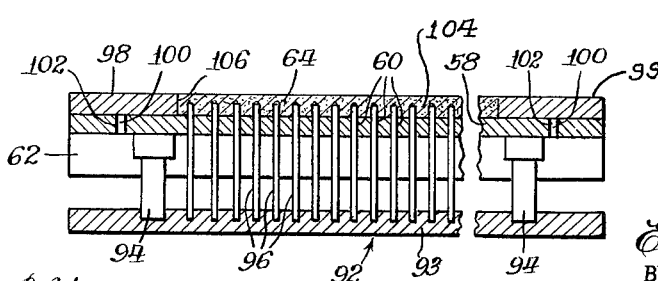
INVENTOR.
Edmund Q. Sylvester
BY
Atty.
Witness:
Robert O. Velte

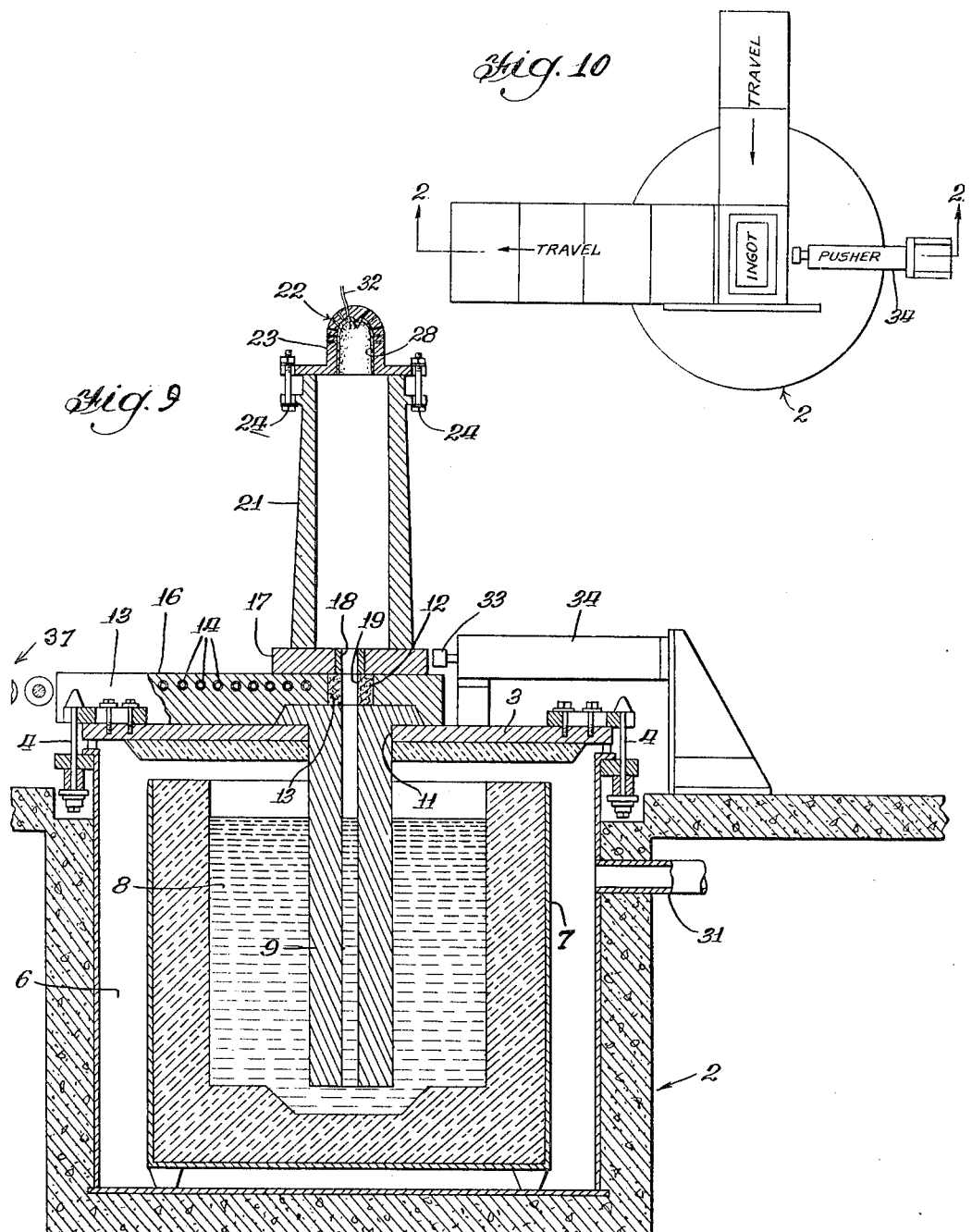

INVENTOR.
Edmund Q. Sylvester
BY Walter F. Schlegel, Jr.
Atty.

Dec. 14, 1965    E. Q. SYLVESTER    3,222,735
PRESSURE CASTING APPARATUS WITH GAS-PERMEABLE CHILL ASSEMBLY
Filed June 19, 1963    5 Sheets-Sheet 5
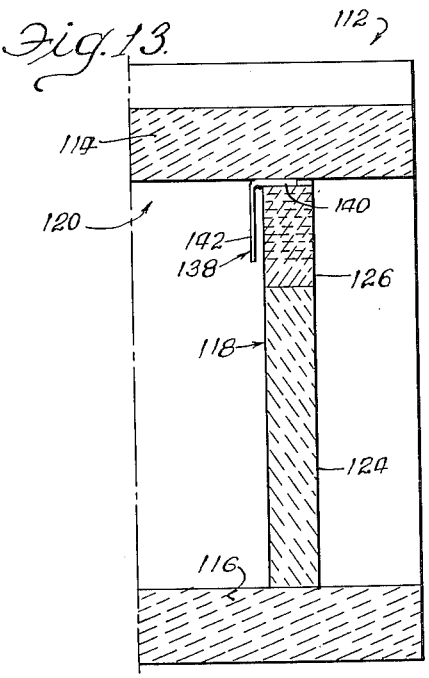
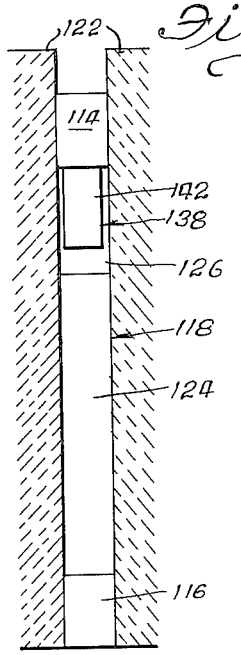
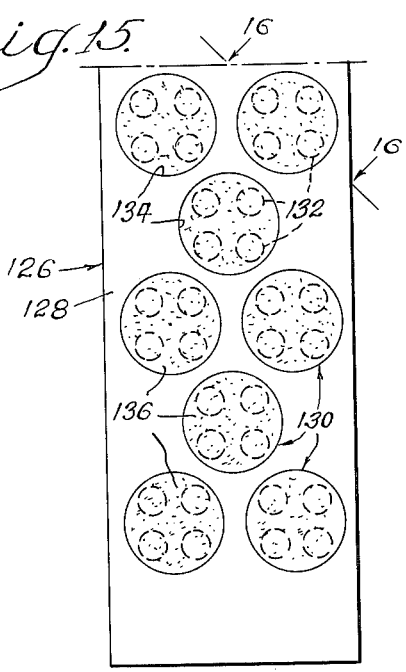
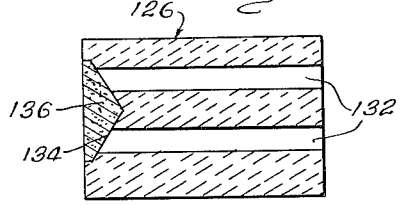
Witness:
R. Faust
INVENTOR.
Edmund Q. Sylvester
BY Walter S. Schlegl, Jr.
Atty

United States Patent Office 3,222,735
Patented Dec. 14, 1965

3,222,735
PRESSURE CASTING APPARATUS WITH GAS-PERMEABLE CHILL ASSEMBLY
Edmund Q. Sylvester, Shaker Heights, Ohio, assignor to Amsted Industries Incorporated, Chicago, Ill., a corporation of New Jersey
Filed June 19, 1963, Ser. No. 290,278
17 Claims. (Cl. 22—69)

The present application is a continuation-in-part of my copending application, Serial No. 160,687, filed December 6, 1961, now abandoned; the latter application was a continuation-in-part of my prior, and then copending, application, Serial No. 768,904, filed October 22, 1958, later forfeited; the last mentioned application, in turn, was a division of, and copending with, a still earlier application, Serial No. 540,402, filed October 14, 1955, now abandoned.

This invention relates generally to the art of casting of metals, and more specifically apparatus therefor, for pressure casting molten metal into a mold cavity or cavities.

In many present structures for the pressure casting of molten metals, the cooperating mold assemblies are provided with either a continuously open end or with valving means for closing the otherwise open end of the mold cavity as soon as the cavity is completely filled. The primary purpose of both of these arrangements is to permit the escape of any gases from within the mold cavity to the ambient atmosphere.

It is essential that gases be eliminated from within the mold cavity in all casting operations in order to assure proper formation of the cast article. This, in the past, has been substantially achieved by employing casting apparatus as generally set out above; that is, by the provision of one or more openings communicating directly between the mold cavity and the atmosphere. Such apparatus, although used, has not proven to be entirely satisfactory.

For example, a mold assembly having an opening communicating directly with the atmosphere presents a danger of spilling molten metal by accidentally tipping the mold assembly. Additionally, any such openings will in many cases cause substantial protrusions on the cast article requiring additional subsequent removal thereof as by means of cropping, cutting or grinding. All of these additional operations are of course costly especially since they add no value to the cast article itself but are merely operations preparatory to the formation of the ultimate product desired.

Accordingly, an object of this invention is the provision of gas-permeable means, in an otherwise conventional mold assembly, for closing the end of a mold cavity.

Another object of this invention is to provide, in a mold assembly, gas-permeable means which forms at least a portion of the wall surface defining the mold cavity within said assembly.

Another object of this invention is to provide gas-permeable means which also functions as a chill member.

Still another object of this invention is to provide, for use in a mold assembly, a gas-permeable chill member having varying rates of thermal conductivity in order to accomplish controlled solidification of the molten metal within the mold cavity.

A still further object of this invention is to provide apparatus for quickly and accurately constructing a gas-permeable chill member.

Other objects and advantages will become apparent when reference is made to the following description and drawings wherein:

FIGURE 3 is an enlarged cross-sectional view of a gas-permeable means constructed in accordance with the invention including a fragmentary view of the adjacent structure of the mold as shown in FIGURE 2;

FIGURE 4 is an elevational view of the structure as shown in FIGURE 3 with portions thereof broken away;

FIGURE 5 is a cross-sectional view taken on the plane of line 5—5 of FIGURE 4 and looking in the direction of the arrows;

FIGURE 6 is a plan view of a portion of a modified version of the structure shown in FIGURES 3–5;

FIGURE 7 is a cross-sectional view taken on the line 7—7 of FIGURE 6 and looking in the direction of the arrows;

FIGURE 8 is a cross-sectional view of an apparatus for constructing gas-permeable means suitable to the practice of the invention;

FIGURE 9 is a cross-sectional view of an arrangement for pressure casting of molten metals employing a modified form of a gas-permeable chill member;

FIGURE 10 is a schematic top plan view illustrating the arangement of the pressure casting apparatus illustrated in FIGURE 9;

FIGURE 13 is a vertical sectional view of a portion of a modified form of mold assembly;

FIGURE 14 is a sectional view taken at line 14—14 of FIGURE 13;

FIGURE 15 is an enlarged view taken at line 15—15 of FIGURE 13; and

FIGURE 16 is a sectional view taken at line 16—16 of FIGURE 15.

Certain details may be omitted from one or more figures for purposes of clarity.

Figure 1:
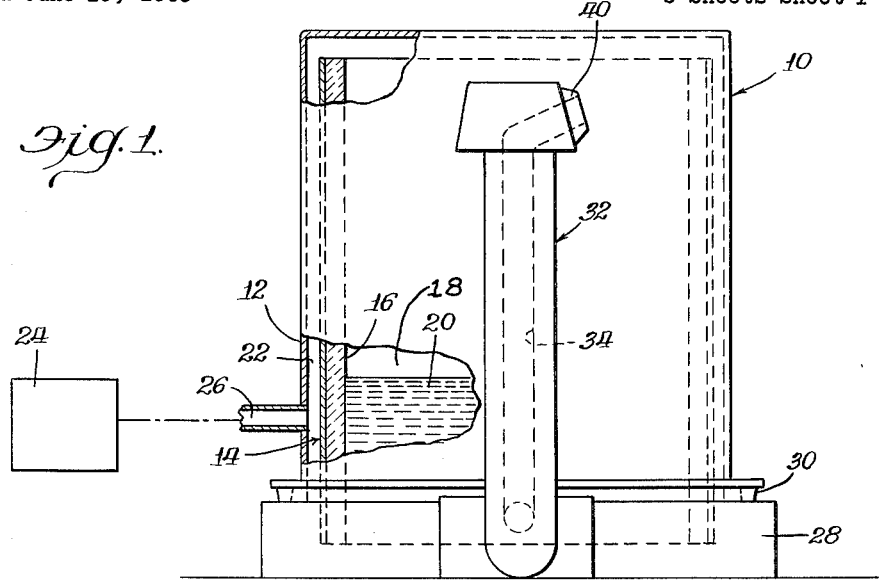
FIGURE 1 is an elevational view, with portions thereof shown in cross-section, illustrating a pressure pouring ladle assembly suitable to the practice of the invention.

Referring now in greater detail to the drawings, FIGURE 1 illustrates a pressure pouring ladle assembly 10 comprised of an outer cover member 12 containing therein a cylindrical open-topped ladle body 14 which has its inner wall surface lined with a suitable refractory material 16 defining a chamber 18 for the reception of molten metal 20 therein. The space 22 between the ladle body 14 and the outer cover member 12 is in communication with a suitable source 24 of relatively high pneumatic pressure as by means of conduit 26. Outer cover member 12 is hermetically sealed onto the base 28, as indicated by the gasket 30. An externally formed pouring tube 32 contains a conduit portion 34 therein which communicates at its opposite ends with the chamber 18 and the cavity 36 of mold assembly 38 in order to at times convey molten metal 20 from chamber 18 to cavity 36.

Figure 2:
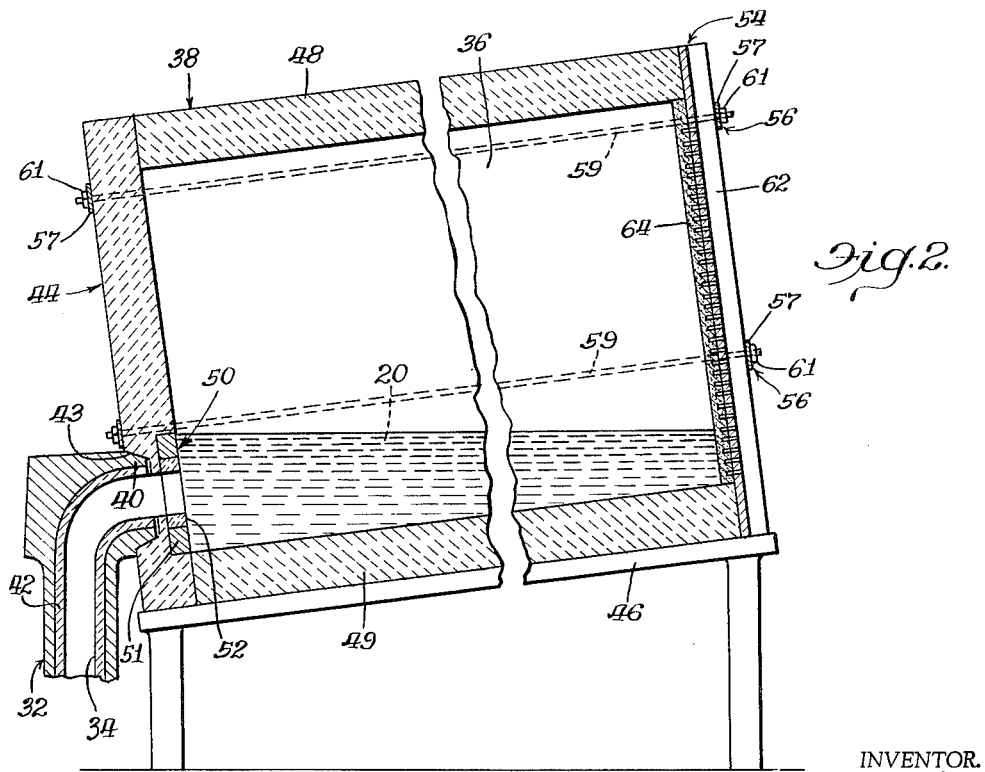
FIGURE 2 is a cross-sectional view illustrating a mold assembly constructed in accordance with the teachings of this invention and is operative engagement with the pressure pouring ladle assembly illustrated in FIGURE 1.
Figure 12:
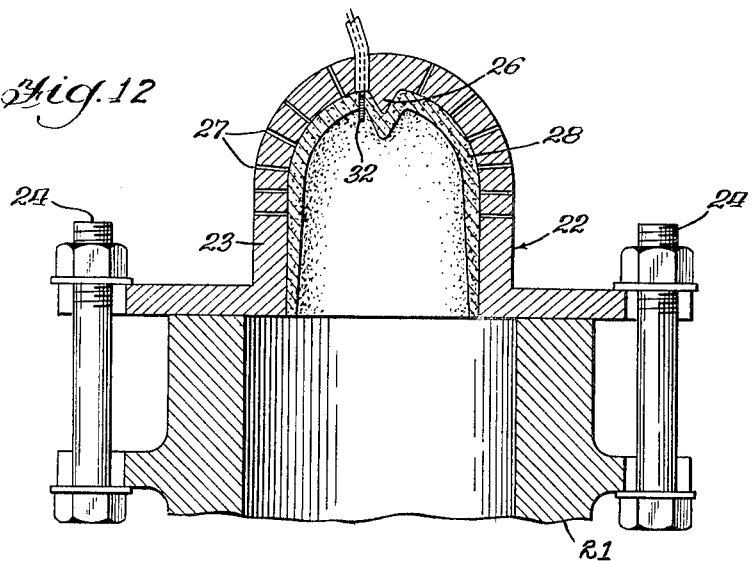
FIGURE 12 is an enlarged fragmentary cross-sectional view illustrating the upper portion of the mold body and gas-permeable chill member secured thereto as illustrated by FIGURE 9.

As will be best seen in FIGURE 2, the pouring tube 32 terminates in a generally frusto-conical nozzle 40 into which the refractory lining 42 of the spout is preferably extended. The nozzle 40 is located above the maximum height to which molten metal 20 may be placed in the ladle 10. Registered with the nozzle 40 is the mold assembly 38 comprised of an end member 44 having a socket 43 which mates in sealing engagement with nozzle 40. The mold assembly 38 may be supported upon suitable inclined supports 46.

The mold assembly 38 is further comprised of what may be generally referred to as cope and drag sections 48 and 49, respectively, which are of a material having a relatively high thermal conductivity such as a graphite. The cavity 36 is defined within the mold assembly 38 by the cooperation generally of cope and drag sections 48 and 49, end member 44 and a vent plug assembly 54. Even though only one cavity is illustrated, it is of course apparent that a plurality of cavities could be employed in carrying out the invention.

The end member 44 preferably contains a suitable cut-off mechanism 50 having a slide 51, containing therein a refractory lined opening 52, which at times is actuated transversely of the mold 38. Opening 52 is, of course, in alignment with conduit 34 during the pressure pouring operation.

Even though such materials as brass and copper have been found suitable for forming end member 44, it is preferred that member 44 be comprised of graphite or a graphite mixture.

The vent plug assembly, as illustrated in greater detail in FIGURES 3 and 4, is comprised of a back plate 58 to which is secured a gas-permeable liner 64 which may be composed of sand or a sand mixture. The back plate 58 is provided with a plurality of passageways 60 formed through said back plate 58 and preferably arranged with respect to each other so as to form a plurality of rows as illustrated at 67. The passageways 60 are also extended a substantial distance into the liner 64 as represented by passageway portions, or blind openings 70. It should be noted that although passageway portions 70 are formed a substantial distance within liner 64, they nevertheless do not extend therethrough.

The lines 64 which, by way of example, may be comprised either of a silica or zircon sand, or a mixture thereof, provided with a resin binder, is preferably secured to the back plate 58 by use of suitable protrusions provided on back plate 58 forming locking surfaces to which the liner 64 may adhere. Such protrusions may take the form of metal rods 68 suitably secured as by welding to the backing plate between the rows 67. Other means may, of course, be employed for forming such protrusions, as for example, a plurality of metal pins secured to and extending outwardly from said backing plate 58. Reinforcing members 62 may be provided and secured to back plate 58 in order to assure rigidity. Selective placement of rods 68 inwardly of said members 62, as illustrated, will of course add to the rigidity of the middle portion of the back plate 58.

Holes 70 are provided in order to increase, generally, the permeability of the overall vent plug assembly 54. That is, as the number of such holes increases, the total cross-sectional area available for unrestricted flow of gases increases thereby proportionately increasing the permeability of assembly 54. Vent plug assembly 54 may be secured to the mold assembly by any suitable means such as, for example, strap-like clamping means 56 including transversely disposed straps 57 retained by threaded rod portions 59 and locking nuts 61.

*Operation*

After mold assembly 38 is brought into functional engagement with end 40 of pouring tube 32, pneumatic pressure is admitted to chamber or space 22, by means of conduit 26, causing the molten metal 20 within chamber 18 to flow upwardly through conduit 34, orifice 52 and into mold cavity 36. As the molten metal flows into cavity 36, the available space within the cavity defined above the surface of the molten metal, continually decreases causing the air or gas contained within such space to be forced outwardly through the gas-permeable chill assembly 54 to the ambient atmosphere.

The liner 64, due to its density, allows the escape of air and gas while not permitting the passage of molten metal therethrough. The vent plug assembly 54 also acts as a chill member thereby causing the molten metal, which comes into contact therewith, to freeze relatively rapidly.

FIGURES 6 and 7 illustrates a modified vent plug assembly 54a comprised of a backing member 85 having formed thereon projections 82 which may be arranged in a plurality of rows with respect to each other. A sand liner 64a, provided atop said backing member 85, may be secured thereto as by adherance to projections 82.

Passage means 86, formed through back plate 85, and projections 82 extend into the sand liner 64a so as to form blind conduit portions 87. Sand liner 64a, which may be comprised of materials similar to those comprising liner 64, holes 87 and 86 formed in liner 64a and member 85, respectively, perform the same function as their counterparts in the vent plug assembly 54 of FIGURES 3 and 4.

Back members 58 and 85 may be made of either graphite, mixture or metal, such as steel. The selection of the precise material will possibly be influenced by physical limitations of the environment, thermal conductivity desired and operating temperatures to which such material will be exposed.

The vent plug assembly of either FIGURES 3 and 4 or 6 and 7 may be further modified by the selective addition or elimination of passages 60 or 86 and further by the elimination of projections 82.

In certain situations it may be desirable to increase or retard the rate of thermal conductivity in certain portions of the vent plug assembly in order to enhance or retard the freezing rate of the molten metal in contact with such portions. Accordingly, the thermal conductivity can be controlled by the elimination or addition of holes through the backing member 85 as illustrated, for example, by additional holes 90 in FIGURE 6. Holes 90 may, of course, be made to extend through only the back member 85 or alternatively extend into the sand liner 64a a substantial distance. By adding such holes 90 the effective thickness of the material between the molten metal and the ambient atmosphere is reduced thereby causing the atmosphere to become a greater factor in determining the effective sink temperature.

Another manner of generally accomplishing the above result would be to vary the thickness of the sand liner 64a and/or the thickness of the backing member 85. This can be done by increasing the depth of valleys 91 or reducing the height of the projections 82, or any combination thereof.

Reference to FIGURE 8 will disclose a method for constructing a vent plug assembly for the practice of the invention and an apparatus suitable for carrying out the method. Accordingly, FIGURE 8 illustrates a fixture 92 comprised of a lower base member 93 having secured thereto locating pedestals 94 and pin members 96. Backing plate 58 is placed atop pedestals 94 in a manner permitting the passage of pins 96 through passageways 60 so as to extend upwardly therethrough a substantial distance.

A combination frame and gauge member 98 is, in turn, placed atop the back plate 58 and laterally located with respect thereto by means of coacting locating pins 100 and guide holes 102 formed as part of frame 98 and backing plate 58, respectively. Subsequently, the inner space 104, defined by the circumscribing wall surface 106, is filled with sand, or sand mixture containing a resin and leveled off to be of the same height as surface 99 of frame 98, this being the thickness of the sand liner desired. The entire assembly, including the fixture, may then be heated so as to polymerize the resin in order to bond the sand. Thereafter, the fixture may be withdrawn leaving a vent plug assembly suitable for immediate use having the hole portions 70 already formed by the projecting pins 96.

A further modification of the invention is illustrated generally by FIGURES 9–12. For example, FIGURE 9 illustrates a ladle assembly 2' having a cover 3' detachably secured thereon by means of bolts 4' to form a chamber 6' to receive a ladle body 7' filled with molten metal 8', such as steel.

A tubular pouring spout 9' formed from a suitable refractory mix projects downwardly through an opening 11' in the cover 3' to terminate adjacent the bottom of the ladle body 7'. A ceramic ring 12' is mounted on the upper end of the spout for the passage of molten metal upwardly therethrough, the ring extending through an aperture in a deck 13' secured to the cover 3' by any suitable fastening means, such as bolts (not shown).

The deck 13' may be formed of copper, graphite or any other suitable material and has pipes 14' embedded therein for the circulation of cooling liquid therethrough to maintain the deck in a relatively cool condition. The deck is formed with a smooth top surface 16' to slideably support a pallet or stool 17' having a gate or aperture 18' for registry with the opening 19' in the ring 12'.

A mold body 21', or wall, illustrated as tubular in form, is mounted upon and has its lower end defined by the stool 17'. An end closure assembly 22' formed with a dome or head 23' is detachably secured to the upper end of the mold body 21' by means of bolts 24'.

The head 23' is provided with an inner sand liner 28' comprising a resin bonded sand. The sand liner is formed by heating the head 23' to a temperature of, for example, from 400° to 500° F. and then completely filling the heated head with a mix comprising sand and a suitable thermo-setting resin which is thus baked and bonded to the inner surface of the head. By rotating the head to the position shown in FIGURE 10, the unbaked portion of the mix drops out of the head to leave the latter with a liner of predetermined thickness. Accordingly, in this manner, the head 23' and cooperating flange portions 25' act as a backing member for the sand liner 28'. It will be apparent that the thickness of the liner is dependent on the temperature of the head, the baking time and the composition of the mix.

A plurality of apertures or passageways 27' are formed within head 23' in order to allow the escape of gases therethrough as such gases are forced upwardly out of mold 21' and through the gas-permeable sand liner 28' by the molten metal as it enters the mold 21'. Although not entirely necessary to the practice of the invention, a conical or triangular shape boss, or projection, 26' may be formed on the upper inner surface of the dome head 22', and centrally thereof, in order to provide an atmospheric break-through into the head.

The stool 17' with the mold thereon is adapted to be moved along the upper surface 16' of the deck 13' to dispose the stool aperture 18' in registry with the pouring opening 19', as illustrated in FIGURE 9. If desired, suitable guides or abutments (not shown) may be provided in the deck surface 16' to abut two sides of the stool to insure proper positioning of the stool over the pouring opening 19'. Suitable means (not shown) may also be provided to secure the mold and stool against movement upwardly away from the deck during the pouring operation.

To fill the mold with molten metal, the chamber 6' is filled with air under superatmospheric pressure passing through an inlet pipe 31' from a compressor or air supply tank (not shown) to cause the metal to flow upwardly through the tube or spout 9' into the interior of the mold. Preferably, when the mold is filled with metal, the metal engages an electrical contact 32' projecting downwardly through the upper end of the head 23' to thus complete an electrical circuit to means controlling the operation of a piston 33' within a cylinder 34' to cause the piston to engage and move the stool and the mold thereon along the deck surface 16' until the stool aperture 18' is out of registry with the pouring opening 19'. After the stool has been moved into position to close the pouring opening 19', a valve 36' in the inlet pipe 31' is then opened to the atmosphere to reduce the air pressure in the chamber 6' and thus cause a drop in the level of the metal in spout 9', after which the piston acts to push the stool 17' and its mold along the deck surface 16' onto a discharge conveyor 37'.

Figure 11:
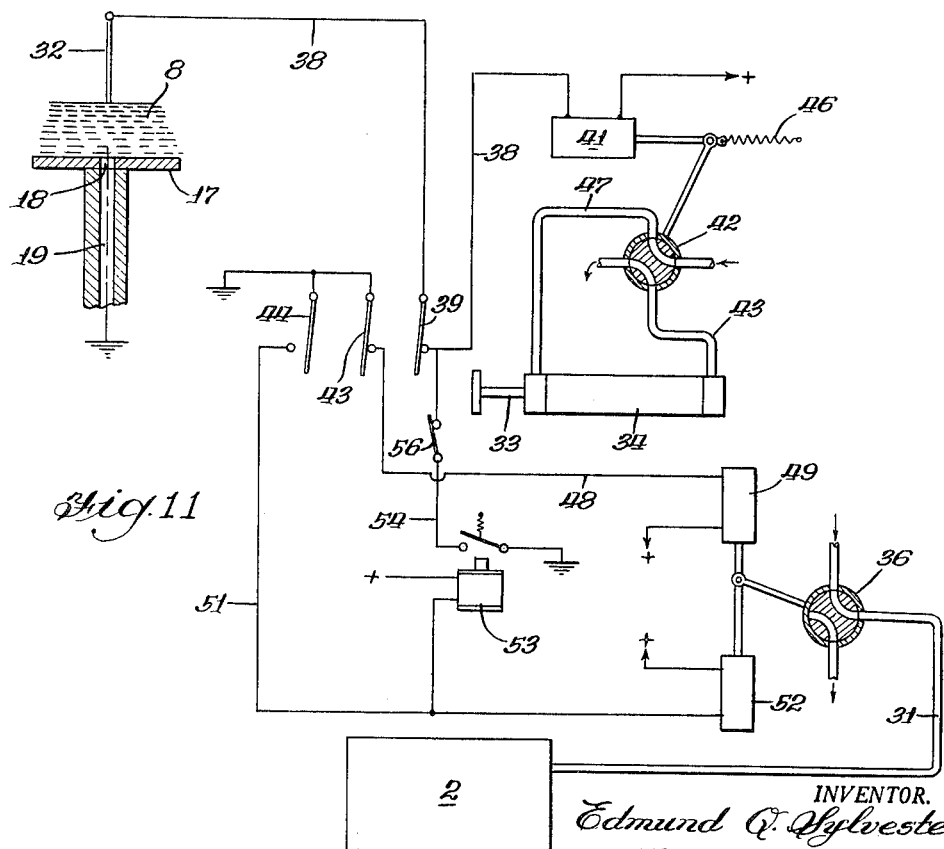
FIGURE 11 is a diagrammatic view illustrating the means provided for controlling the casting operation as performed by the arrangement of FIGURE 9.

FIGURE 11 illustrates diagrammatically the means employed for automatically controlling the operation of the apparatus thus described. When the molten metal engages the contact 32', an electrical circuit is completed through a lead 38' and switch 39' to a solenoid 41' which actuates a three-way valve 42' to direct liquid under pressure through a conduit 43' into the cylinder 34' to cause the piston 33' to engage and move the stool 17' along the deck surface 16' until the pouring opening 19' is closed by the stool. After the stool has been moved a sufficient distance to close the pouring opening 19', the piston engages and opens switches 39' and 43', and closes switch 44'. When the switch 39' is opened, the solenoid 41' is de-energized and a tension spring 46' actuates the three-way valve 42' to direct liquid under pressure through a conduit 47' into the forward end of the cylinder 34' to return the piston to its retracted position.

When the switch 43' is moved to open position, an electrical circuit through lead 48' to a solenoid 49' is broken to de-energize the solenoid. Upon closing of the switch 44', a circuit is completed through lead 51' to a solenoid 52' which is operative to actuate the four-way valve 36' to shut off air pressure and to exhaust the compressed air from the chamber 6' through conduit 31' to the atmosphere.

After the air pressure within the chamber 6' has been reduced to an atmospheric or sub-atmospheric condition, a time delay relay 53' may, if desired, be provided to close a circuit through lead 54' to the solenoid 41' to actuate the valve 42' to direct liquid through the conduit 43' into the cylinder 34' to cause the piston 33' to slide the stool from its closed position over the pouring opening 19' onto the discharge conveyor 37'. A manually operable switch 56' provided in the lead 54' is moved to open position to break the circuit to the solenoid 41' to permit the spring 46' to actuate the valve 42' to direct liquid through the conduit 47' into the cylinder 34' to move the piston 33' to its initial retracted position.

After another stool and mold have been positioned on the deck surface 16', as illustrated in FIGURE 9, the switches 39', 43' and 56' are manually closed and the switch 44' is opened to initiate another pouring operation.

FIGURES 13–16 inclusive show another form of mold assembly, 112, which is similar to the construction of FIGURE 2 in that it includes the same general components; the mold assembly 112 includes a cope section or top block 114 and a drag section or bottom block 116. It also includes an end member 118 corresponding generally with the vent plug assembly 54 of FIGURE 2. Opposite the end member 118 is another end member corresponding with the end member 44 of FIGURE 2, at the lower portion of which is a filling aperture for operative association with a pouring tube for filling the cavity of the mold assembly, this cavity being indicated generally at 120. The cavity is defined, in addition to the bounding members just referred to, by the side blocks 122. The relation between these various bounding members is believed fully illustrated in FIGURES 13 and 14 and need not be described in detail; for convenience, only that portion of the mold assembly opposite the filling aperture is illustrated.

The end member 118 may also be referred to as a venting assembly in that it includes provision for venting the cavity 120 in the filling operation. All of the bounding members referred to may be made of solid graphite, except certain minor elements which will be referred to specifically below herein. This end member 118 includes a bottom main portion 124 and a vent block 126, the vent block constituting a relatively small portion at the top thereof. The vent block 126 is best illustrated in FIGURES 15 and 16 and includes a main body portion 128 also composed mainly of graphite, and a plurality of venting passages 132 arranged preferably in a plurality of groups of four each. At the end of each group of passages the block is formed with a recess 134 in its inner surface facing the cavity of the mold assembly. These recesses may be conical in shape and the four passages 132 communicate with and lead from the recess through the vent block to atmosphere. These passages may be of substantial dimensions to totally eliminate all friction to the flow of air therethrough.

The recesses 134 are provided with gas-permeable material 136 which enables air and other gases to flow therethrough but prevents the flow of molten metal therethrough. This gas-permeable material may consist of sand, or sand and other components mixed therewith, similar to the sand liner 28' of FIGURES 9 and 10 and made in a manner similar to that described above in connection with that sand liner.

Mounted in association with the vent block 126 is a steel deflector or shield member 138 which is mounted in position by clamping a leg portion 140 thereof between the vent block and the cope section. The main portion 142 thereof extends downwardly over and along the inner face of the vent block in spaced relation thereto. This main portion 142 may be narrower than the cavity as indicated in FIGURE 14. This deflector or shield serves to shield the vent block, and particularly the sand portions 136 thereof, against damaging action by the molten metal, without however impairing the escape of gases from the cavity. The mold assembly 112 may be mounted with the right hand end elevated and the filling aperture lowered, in the manner indicated in FIGURE 2, whereby the vent block 126 is approximately at the highest point of the mold cavity.

Although certain embodiments of the invention have been disclosed and described, it is apparent that other modifications of the invention are possible within the scope of the appended claims.

I claim:

1. In an arrangement for casting molten metal the combination of: a pressure container for holding the molten metal; a mold assembly; a cavity formed within said mold assembly; said cavity having one end communicating with said container and having another end defined by a gas-permeable chill member; means for applying superatmospheric pressure to said container in order to force the molten metal therein into said cavity; and means for sealing said one end after said cavity is filled.

2. A gas-permeable chill assembly, comprising a backing plate, a plurality of projections formed on said backing plate, a liner of gas-permeable refractory material formed on said backing plate and at least partially enveloping said projections in order to secure said liner to said backing plate, a plurality of first passageways extending through said backing plate, and a plurality of second passageways extending a partial distance into said liner and communicating with at least some of said plurality of said first passageways.

3. A gas-permeable chill assembly, comprising a backing plate, a plurality of projections formed on said backing plate, a liner of gas-permeable refractory material formed on said backing plate and at least partially enveloping said projections in a manner securing said liner to said backing plate, a plurality of passageways extending through said backing plate and said projections, and a plurality of conduit portions extending a substantial distance into said liner and communicating with at least some of said passageways.

4. A vent plug assembly, comprising a back plate, a gas-permeable sand liner secured to said back plate, said sand liner comprising a mixture of zircon sand provided with a resin binder, a plurality of passageways formed through said back plate and arranged with respect to each other to form a plurality of rows, plurality of openings extending into but not through said sand liner, said openings in said sand liner communicating with said passageways, a plurality of rods secured to the surface of said back plate facing the said liner between the rows of passageways forming a locking surface to which said sand liner may adhere, and a plurality of reinforcing members secured to another side of the back plate to increase the rigidity of said back plate.

5. In a gas-permeable chill assembly for a mold having a wall defining a cavity open at its upper end, a metal casting having a base adapted to be detachably secured to said wall to close the upper end of the cavity, a hollow dome-shaped head extending upwardly from said base and provided with small gas vent apertures, and a liner of gas-permeable refractory material covering the inner surface of said head and said apertures for the escape of gases through said liner and apertures.

6. In a gas-permeable chill assembly for a mold having a wall defining a cavity open at its upper end, a metal casting having a base adapted to be detachably secured to said wall to close the upper end of the cavity, a hollow dome-shaped head extending upwardly from said base and provided with small gas vent apertures, and a liner of gas-permeable refractory material covering the inner surface of said head and said apertures for the escape of gases through said liner and apertures, said liner comprising a mix of sand and thermo-setting resin.

7. In a gas-permeable chill assembly for a mold having a wall defining a cavity open at its upper end, a metal casting having a base adapted to be detachably secured to said wall to close the upper end of the cavity, a hollow dome-shaped head extending upwardly from said base and provided with small gas vent apertures, and a liner of gas-permeable refractory material covering the inner surface of said head and said apertures for the escape of gases through said liner and apertures, said liner comprising a mix of sand and thermo-setting resin, said head having a downwardly tapering internal projection covered by said liner.

8. A gas-permeable closure assembly for a mold having a wall partially defining a cavity open at one end to the atmosphere, comprising a cover member adapted to be detachably secured to said mold in a manner closing said one end of the cavity with the inner surface of said cover member, a plurality of gas-vent apertures provided through said cover member, and a liner of gas-permeable refractory material covering at least a portion of said inner surface of said cover member for the escape of gases through said liner and apertures.

9. A gas-permeable closure assembly for a mold having a wall partially defining a cavity open at one end to the atmosphere, comprising a cover member adapted to be detachably secured to said mold in a manner closing said one end of the cavity with the inner surface of said cover member, a liner of gas-permeable refractory material covering at least a portion of said inner surface of said cover member, and a plurality of gas-vent apertures provided only through said cover member for the escape of gases through said liner and cover member.

10. A gas-permeable closure assembly for a mold having a wall defining a cavity open at one end to the atmosphere, comprising a cover member adapted to be detachably secured to said mold in a manner closing said one end of the cavity with the inner surface of said cover member, said inner surface being formed to provide a desired shape to the end of said cavity, a liner of gas-permeable refractory material covering at least a portion of said inner surface of said cover member, and a plurality of gas-vent apertures provided only through said cover member for the escape of gases through said liner and cover member.

11. An arrangement for casting molten metal comprising a ladle assembly for containing a reservoir of molten metal, a mold assembly, a cavity formed within said mold assembly and having one end adapted for communication with said ladle assembly, and a gas-permeable chill assembly detachably secured to said mold assembly generally defining another end of said cavity, said gas-permeable chill assembly comprising a backing member, a liner of gas-permeable refractory material secured to said backing member, said liner being so formed as to substantially conform to the cross-sectional area of said cavity at said other end and extend inwardly into said cavity to form at least a portion of the wall surface defining said cavity, a plurality of passageways formed through said backing member, and a plurality of conduit portions formed into said liner, said conduit portions and said passageways being arranged so as to be in substantial alignment with each other.

12. A gas-permeable closure assembly for a mold having a cavity open at one end to the atmosphere, comprising a graphite cover member adapted to be detachably secured to said mold in a manner closing said one end of the cavity with the inner surface of said cover member, a plurality of projections formed on said inner surface and arranged in a plurality of rows, a plurality of first passageways formed through said cover member and said projections, a plurality of second passageways formed through said cover member between at least certain ones of adjacent projections, a liner of gas-permeable refractory material extending into said cavity and at least partially enveloping said projections in order to secure said liner to said cover member, and a plurality of conduit portions extending partially into said liner and communicating with at least some of said first passageways.

13. A gas-permeable closure assembly for a mold having a cavity open at one end to the atmosphere, comprising a graphite cover member adapted to be detachably secured to said mold in a manner closing said one end of the cavity with the inner surface of said cover member, a plurality of rectangularly shaped projections formed on said inner surface and arranged in a plurality of parallel rows, a plurality of first passageways formed through said cover member and said projections, a plurality of second passageways formed through said cover member between at least certain ones of adjacent projections, a liner of gas-permeable refractory material extending into said cavity and at least partially enveloping said projections in order to secure said liner to said cover member, and a plurality of conduit portions extending partially into said liner and communicating with at least some of said first passageways.

14. Apparatus for casting molten metal, comprising a mold assembly including bounding members defining a mold cavity, a first of the bounding members having a filling aperture adjacent a lower portion of the cavity adapted for operative association with a pressure pouring tube for filling the cavity with molten metal therefrom, and another of the bounding members remote from said first bounding member having, at least at a location adjacent the upper portion of the cavity, venting means including an inner material capable of venting gas therethrough but operative for preventing flow of molten metal therethrough, and having passages leading from said gas-permeable material to atmosphere.

15. Apparatus for casting molten metal as set out in claim 14 wherein said remote bounding member is an end member positioned generally upright, of which the lower portion is solid and the venting means is a vent block in the upper portion of the end member.

16. Apparatus for casting molten metal set out in claim 15 wherein the vent block includes a solid body with recesses in its inner surfaces filled with gas-permeable material, and open passages leading from that gas-permeable material to the exterior.

17. Apparatus for casting molten metal as set out in claim 16 and including a deflector overlying the inner face of the vent block in spaced relation thereto.

References Cited by the Examiner

UNITED STATES PATENTS

| | | | |
|---|---|---|---|
| 86,479 | 2/1869 | Oliver | 22—176 |
| 166,324 | 8/1875 | Welling | 22—176 |
| 686,952 | 11/1901 | Price et al. | 22—183 |
| 1,596,815 | 8/1926 | Dooley et al. | 22—126 |
| 2,435,121 | 1/1948 | Bean | 22—192 |
| 2,445,141 | 7/1948 | Hardy | 22—193 |
| 2,480,896 | 9/1949 | Bean | 22—192 |
| 2,997,756 | 8/1961 | Strom | 22—69 |

J. SPENCER OVERHOLSER, *Primary Examiner.*

MARCUS U. LYONS, *Examiner.*